United States Patent
Kohn et al.

(10) Patent No.: US 10,794,157 B2
(45) Date of Patent: Oct. 6, 2020

(54) DOWNHOLE REMOTE TRIGGER ACTIVATION DEVICE FOR VLH BIG BORE AND MONO BORE CONFIGURED RUNNING TOOLS WITH PROGRAMMING LOGIC (71) Applicant: Halliburton Energy Services, Inc., Houston, TX (US)

(72) Inventors: Gary Allen Kohn, Carrollton, TX (US); Emile Edmund Sevadjian, Carrollton, TX (US); Irvine Cardno Brown, Cults (GB); Michael John Christie, Aberdeen (GB); Michael Adam Reid, Kingwells (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/752,499

(22) PCT Filed: Mar. 27, 2017

(86) PCT No.: PCT/US2017/024298
§ 371 (c)(1),
(2) Date: Feb. 13, 2018

(87) PCT Pub. No.: WO2018/182565
PCT Pub. Date: Oct. 4, 2018

(65) Prior Publication Data
US 2020/0208502 A1 Jul. 2, 2020

(51) Int. Cl.
E21B 34/06 (2006.01)
E21B 47/12 (2012.01)
E21B 43/10 (2006.01)
E21B 23/00 (2006.01)
E21B 33/14 (2006.01)

(52) U.S. Cl.
CPC ............ E21B 43/103 (2013.01); E21B 23/00 (2013.01); E21B 33/14 (2013.01); E21B 34/063 (2013.01); E21B 47/12 (2013.01); E21B 2200/05 (2020.05)

(58) Field of Classification Search
CPC ...... E21B 34/085; E21B 47/12; E21B 47/138; E21B 2200/05
See application file for complete search history.

(56) References Cited

U.S. PATENT DOCUMENTS

| 5,447,202 | A | 9/1995 | Littleford |
| 9,518,446 | B2* | 12/2016 | Reid ................ E21B 43/16 |
| 2007/0007016 | A1 | 1/2007 | Sanderlin |
| 2009/0272544 | A1 | 11/2009 | Giroux |
| 2010/0071896 | A1* | 3/2010 | Christie ............. E21B 34/08 166/250.01 |
| 2010/0193198 | A1 | 8/2010 | Murray et al. |
| 2011/0280104 | A1 | 11/2011 | McClung, III |

(Continued)

Primary Examiner — Shane Bomar
(74) Attorney, Agent, or Firm — Scott Richardson; Parker Justiss, P.C.

(57) ABSTRACT

A method, a device and a system for activating a running/setting tool are provided. The method includes: 1) detecting a wellbore condition at the running tool, 2) based on a signal from surface equipment received at the running tool, initiating an isolation of pressure below the running tool from pressure above the running tool, and 3) if the signal is not received at the running tool, initiating the isolation of pressure below the running tool from the above at a predefined time based on the wellbore condition.

19 Claims, 5 Drawing Sheets (56) References Cited

U.S. PATENT DOCUMENTS

| | | |
|---|---|---|
| 2014/0000877 A1 | 1/2014 | Robertson |
| 2014/0102708 A1* | 4/2014 | Purkis ..................... E21B 43/26 |
| | | 166/308.1 |
| 2014/0360258 A1 | 12/2014 | Hemsing |
| 2015/0315871 A1 | 11/2015 | Fripp et al. |
| 2016/0138373 A1 | 5/2016 | Wood et al. |
| 2016/0281459 A1 | 9/2016 | Stautzenberger et al. |
| 2017/0211328 A1* | 7/2017 | Stone ..................... E21B 7/008 |
| 2019/0085658 A1* | 3/2019 | Reid ....................... E21B 47/06 |

* cited by examiner

DOWNHOLE REMOTE TRIGGER ACTIVATION DEVICE FOR VLH BIG BORE AND MONO BORE CONFIGURED RUNNING TOOLS WITH PROGRAMMING LOGIC

CROSS-REFERENCE TO RELATED APPLICATION

This application is the National Stage of, and therefore claims the benefit of, International Application No. PCT/US2017/024298 filed on Mar. 27, 2017, entitled "DOWNHOLE REMOTE TRIGGER ACTIVATION DEVICE FOR VLH BIG BORE AND MONO BORE CONFIGURED RUNNING TOOLS WITH PROGRAMMING LOGIC". The above application is commonly assigned with this National Stage application and is incorporated herein by reference in its entirety.

BACKGROUND

The present disclosure generally relates to equipment utilized and operations performed in conjunction with a subterranean well and more particularly to a liner hanger running tool and a method of activating the running tool.

Once an annulus is formed and a casing is cemented therein, a liner may be hung off from the inside of the casing using a liner hanger. One type of the liner hanger may be used is an expandable liner, which grips and seals contact with the previous casing by expanding the liner hanger radially outward. The liner hanger is expanded using hydraulic pressure to drive an expanding cone or wedge through the liner hanger. A liner hanger running tool is used to generate this hydraulic pressure for the liner hanger expansion mechanism.

BRIEF DESCRIPTION

Reference is now made to the following descriptions taken in conjunction with the accompanying drawings, in which.

DETAILED DESCRIPTION

It is recognized that for a running tool to generate sufficient hydraulic pressure and set the liner hanger, the running tool must be able to withstand and overcome adverse conditions in the wellbore. Unfortunately, today's running tools have fallen short in many respects. One of the most common problems has been the running tool's activation method, which currently drops a ball from the surface to the running tool to create an isolation needed for building sufficient hydraulic pressure.

Due to the wellbore's substantial depth and deviations and possible issues with cement darts and plug sets, the ball may take a very long time to reach the running tool, if at all. Moreover, even when the ball does reach the running tool, it may not be able to activate the running tool unless it lands properly in the seat because the pressure below the running tool cannot be properly isolated from above the running tool to achieve sufficient pressure to properly expand the liner hanger without proper ball seating. It is, therefore, recognized that improvements are needed in the art of liner hanger running tools and more specifically to devices and methods of activating the running tools.

Introduced herein are new running tool activation devices and methods that activate a running tool autonomously and/or remotely, without relying on a ball-drop activation. The introduced devices and method can autonomously activate a running tool at a predefined time when a certain wellbore condition is detected, and can also activate a running tool remotely using a remote signal, such as a predefined sequence of pressures, movements, compression and tensions, and acoustic signals, from the surface.

It is to be understood that the various features of the current disclosure may be utilized in various orientations, such as inclined, inverted, horizontal, vertical, etc., and in various configurations, without departing from the principles of the present disclosure. The features are described merely as examples of useful applications of the principles of the disclosure, which is not limited to any specific details of these features. As such, those skilled in the art to which this disclosure relates will appreciate that other and further additions, deletions, substitutions and modifications may be made to the described features.

In the disclosure, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
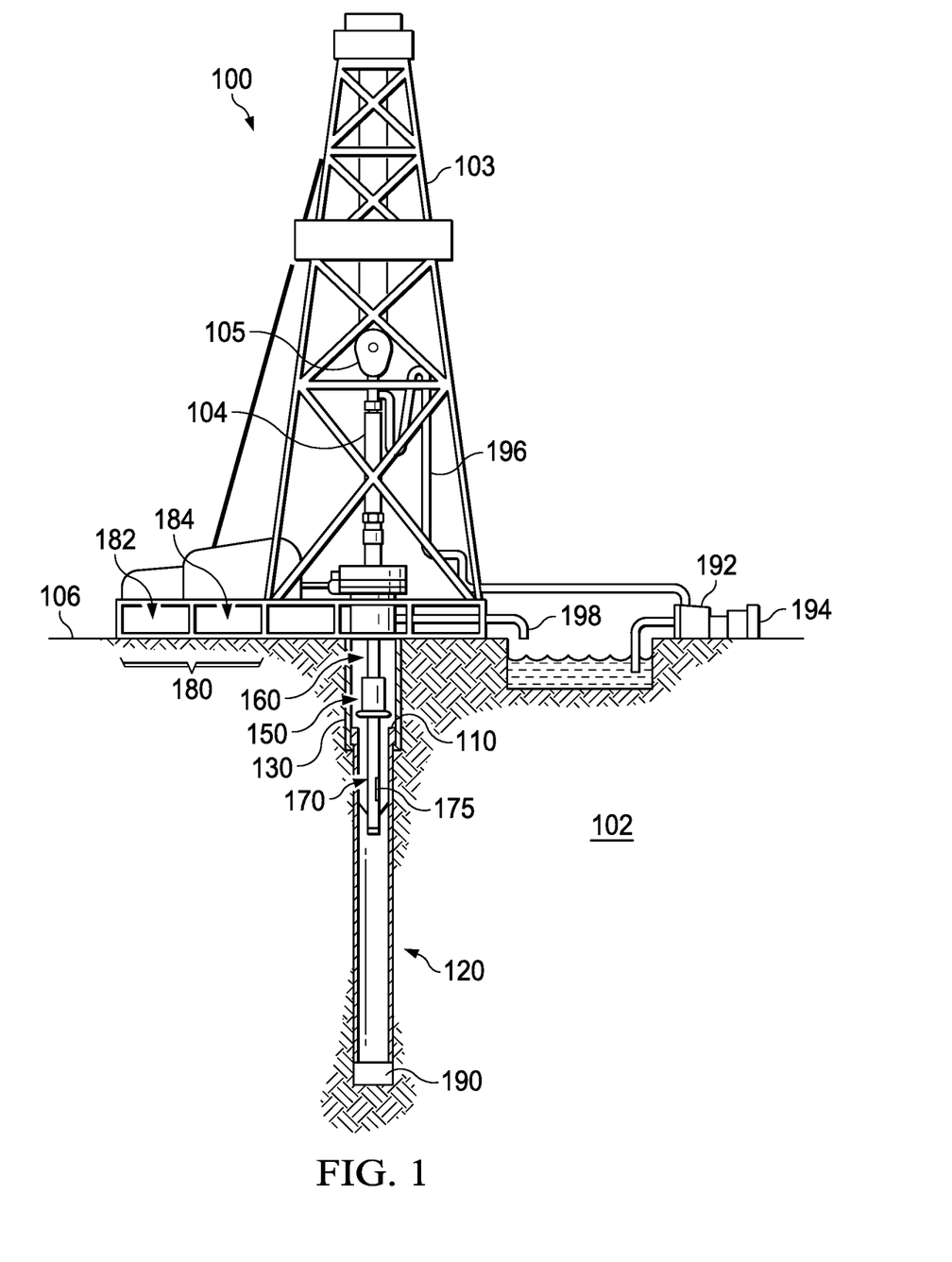
FIG. 1 illustrates a drilling system employing a running tool activation device.

FIG. 1 illustrates a drilling system 100. Drilling system 100 includes a running tool 150, a running tool activation device (RTAD) 170, a liner hanger 110 and a liner 120 that are arranged at the bottom of a drill string 160 and extended into the earth 102 from a derrick 103 at the surface 106. The derrick 103 includes a kelly 104 and a traveling block 105 used to lower and raise the kelly 104 and the drill string 160. The running tool 150, the RTAD 170, the liner hanger 110, and the liner 120 are longitudinally connected to one another conventionally, such as by a threaded connection.

The running tool 150 is attached to the bottom of the drill string 160. When activated, running tool 150 is configured to use cones (not labeled) and a piston assembly (not shown) to set the liner hanger 110 such as an expandable liner hanger.

Below the running tool 150 is the RTAD 170. Based on an activation event, e.g., an activation signal from the surface or an expiration of a predefined time, the RTAD 170 is configured to initiate the activation of the running tool 150 by isolating pressure below the running tool 150 from pressure above the running tool 150 using a flapper 175. While the RTAD 170 is distinguishable from the running tool 150 in FIG. 1, the RTAD 170 may be integrated into the running tool 150. The RTAD 170 is described in more details with respect to FIGS. 2-4.

The liner hanger 110 is located between a previously-run outer casing string 130 and the liner 120. When set by the running tool 150, the liner hanger 110 can attach the liner 120 to the outer casing string 130. In illustrated embodiment, the liner hanger 110 is an expandable liner hanger.

Also included in the drilling system 100 is a controller 180 located at or near the surface 106. The controller 180 is operable to send various types of activation signals to the RTAD 170 to initiate the activation of the running tool 150. The activation signals may be generated using structural elements of the drilling system 100, such as the derrick 103, the kelly 104, and the travelling block 105, and other equipment of the drilling system, such as a pump 192, a prime mover or motor 194, a stand pipe 196, and a flow line 198. These activation signals replace the conventional ball drop activation as the primary activation method of the running tool 150.

Once the running tool 150, the RTAD 170, the liner hanger 110, and the liner 120 are deployed and positioned at the appropriate depth, the running tool 150 is activated. It is understood that when an expandable hanger is used, cement slurry may be pumped before the running tool 150 is activated. The cement slurry is pumped between top and bottom darts or plugs and into the annulus through the bottom plug/dart and a float shoe 190 at the bottom end of the liner 120.

Figure 2:
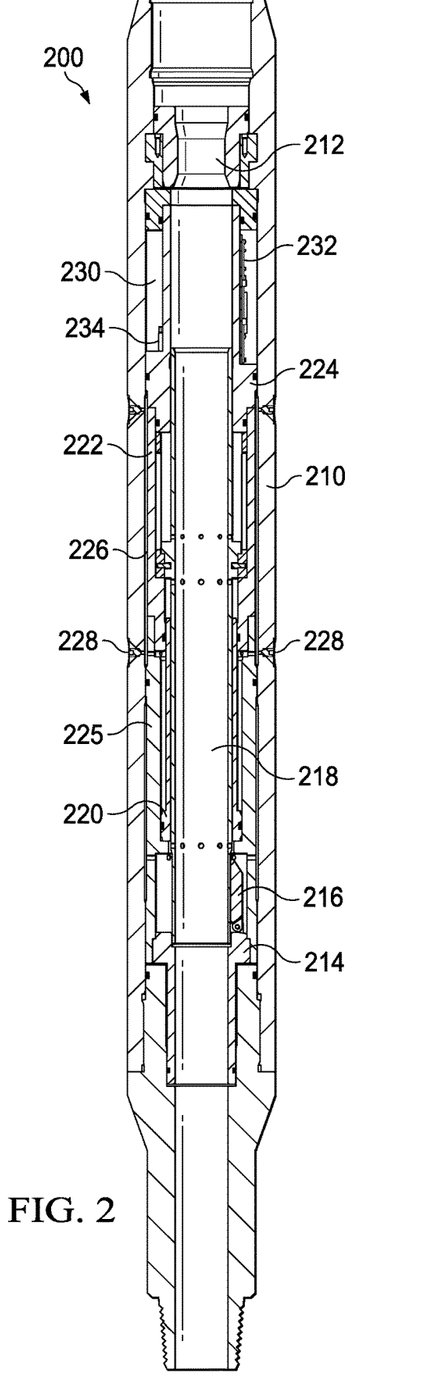
FIG. 2 illustrates a cross-sectional view of a running tool activation device before initiating an isolation of pressure below a running tool from pressure above the running tool.
Figure 3:
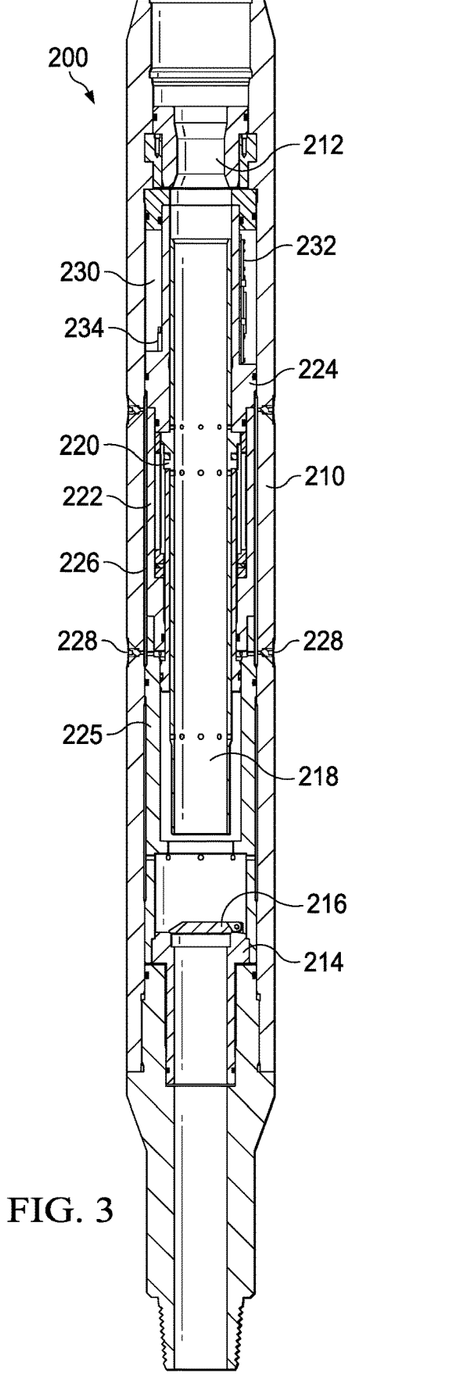
FIG. 3 illustrates a cross-sectional view of the running tool activation device of FIG. 2 after initiating the isolation of pressure below a running tool from above the running tool.

FIGS. 2 and 3 are cross-sectional views of a running tool activation device (RTAD) 200. As mentioned above, the RTAD 200 may be integrated into a running tool or attached to the bottom of a running tool as the running tool 150 in FIG. 1. FIG. 2 shows the RTAD 200 before the isolation of pressure below the running tool from above the running tool and FIG. 3 shows the RTAD 200 after the isolation.

In FIG. 2, the RTAD 200 is housed in an outer housing 210. The RTAD 200 includes a ball seat 212 at an upper end and a flapper seat 214 and a flapper 216 toward a lower end. The ball seat 212 is retained in the RTAD 200 to use the ball drop activation as a backup means to activate the running tool. The flapper 216 is propped against and held open by a flapper operating tube 218 that is slidably disposed inside an activation piston 220.

The activation piston 220, a shear sub-housing 222, an ambient chamber mandrel 224, and a crossover body 225 together form a hydraulic chamber 226. The hydraulic chamber 226 is filled with a light hydraulic fluid to its maximum capacity using high pressure points 228.

Figure 4:
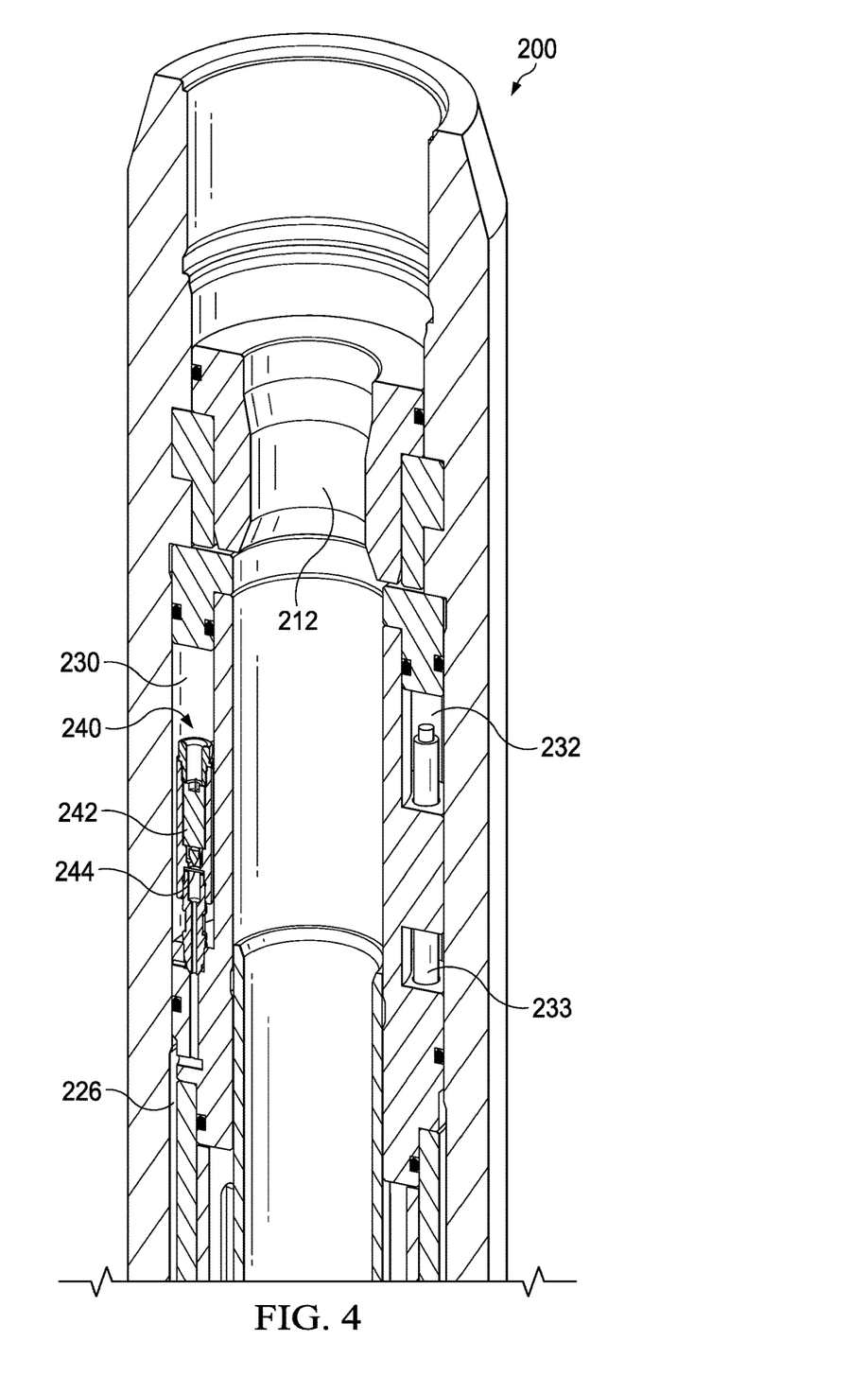
FIG. 4 illustrates an isometric view of the running tool activation device of FIG. 2.

Separated from the hydraulic chamber 226 by a rupture disk 244 (shown in FIG. 4) is an ambient chamber 230. FIG. 4 provides an isometric view of the RTAD 200. As shown in FIG. 4, the ambient chamber 230 is filled with air at ambient pressure and contains a logic board 232, a battery 233, a sensor 234 and a trigger assembly 240.

The logic board 232 is programmed to initiate an isolation of pressure below the running tool from pressure above the running tool based on an activation signal from surface equipment such as the controller 180 in FIG. 1. More specifically, the logic board 232 is configured to process and convert the activation signal into an activation command for the trigger assembly 240 which triggers a closure of the flapper 216.

The activation signal from the surface may be a predefined sequence of pressures applied to an internal sensor of the running tool. A predetermined amount of pressure may be applied to the drill string such as the drill string 160, held for a predetermined length of time and lowered back to zero and again held for another predetermined length of time before repeating. The sequence can be pre-programmed, i.e. before deployment of the RTAD 200, in "Morse Code" fashion to distinguish between an activation signal for a primary logic board such as the logic board 232 and a backup logic board (not shown).

The activation signal may be a predefined sequence of movements of the drill string and the running tool. The drill string connected to the running tool and the RTAD 200 may be rotated and/or linearly translated in a predetermined direction in a start-stop pattern with a predetermined movement duration and idle time, and sequenced in "Morse Code" fashion like the predefined sequence of pressures for the same advantage of distinguishing primary and backup logic boards.

The activation signal may also be a predefined sequence of tension and compression applied to the running tool, or a predefined sequence of acoustic or electrical signals sent to the running tool. It is understood that the activation signal is not limited to any one of the predefined sequences and may be a combination of two or more of the predefined sequences.

The logic board 232 is also programmed to initiate the isolation at a predefined time if no activation signal is received from the surface. Using an internal timer to keep track of the predefined time, the logic board 232 sends an activation command to the trigger assembly 240 to initiate the isolation at the predefined time. The timer may start and restart when a certain wellbore condition such as a predefined range of depth, temperature, hydraulic pressure, circulation rate and/or inclination is detected by the sensor 234. The predefined time may be set and programmed to the logic board 232 prior to the deployment of the RTAD 200 such that the RAID 200 can initiate the isolation autonomously/locally, e.g., without further intervention from the surface once deployed. The predefined time can be determined by an operator and can vary based on different wellbores or well operations. The predefined time can correspond to a time typically required for activating a liner hanger running tool such as disclosed herein.

The battery 233 is configured to provide power to the logic board 232, the sensor 234 and the trigger assembly 240. The battery 233 is provided separately from the surface power source such that the battery 233 can power the RTAD 200 even when the power from the surface becomes unavailable.

The sensor 234 is configured to detect a wellbore condition at the running tool. As mentioned above, the detected wellbore conditions such as depth, pressure, temperature, circulation rate and inclination may serve as a trigger to start the predefined time for the isolation of pressure.

The sensor 234 is also configured to detect/receive the activation signal from the surface. Various types of sensor such as a pressure or piezoelectric sensor may be employed based on the types of the activation signal used by the surface equipment. The sensor 234 includes a transducer to convert the detected condition or the received activation signal into electric signal that may be processed by the logic board 232.

The trigger assembly 240 is configured to rupture the rupture disk 244 when the activation command from the logic board 232 or its backup is received. The trigger assembly 242 includes a needle armed with small explosive charge.

FIG. 3 shows the RTAD 200 after the isolation of pressure below the running tool from above the running tool has been initiated. As mentioned above, the isolation is initiated when the trigger assembly 240 receives the activation command from the logic board 232.

When the trigger assembly 240 receives the activation command from the logic board 232, the explosive charge is detonated and the needle 242 is fired to pierce the rupture disk 244 that separates the ambient chamber 230 from the hydraulic chamber 226. When the rupture disk 244 is pierced, the ambient chamber 230 is intentionally compromised and the light hydraulic fluid trapped in the hydraulic chamber 226 is flooded to the ambient chamber 230. This causes the activation piston 220 to move upward and engage the flapper operating tube 218, which unprops the flapper 216. The flapper 216 is then closed against the flapper seat 214 and isolates pressure below the flapper 216 from the pressure above. At this point, pressure may be built up inside the RTAD 200 and the running tool for pushing down the expansion cone into the liner hanger.

While only one trigger assembly 240 is shown in FIG. 4, there may be at least one backup trigger assembly for rupturing the rupture disk 234 in case the first one fails to fire. For a rare occasion when both the primary and backup trigger assemblies fail to fire, the ball seat 212 may still serve a backup activation means for the running tool.

Figure 5:
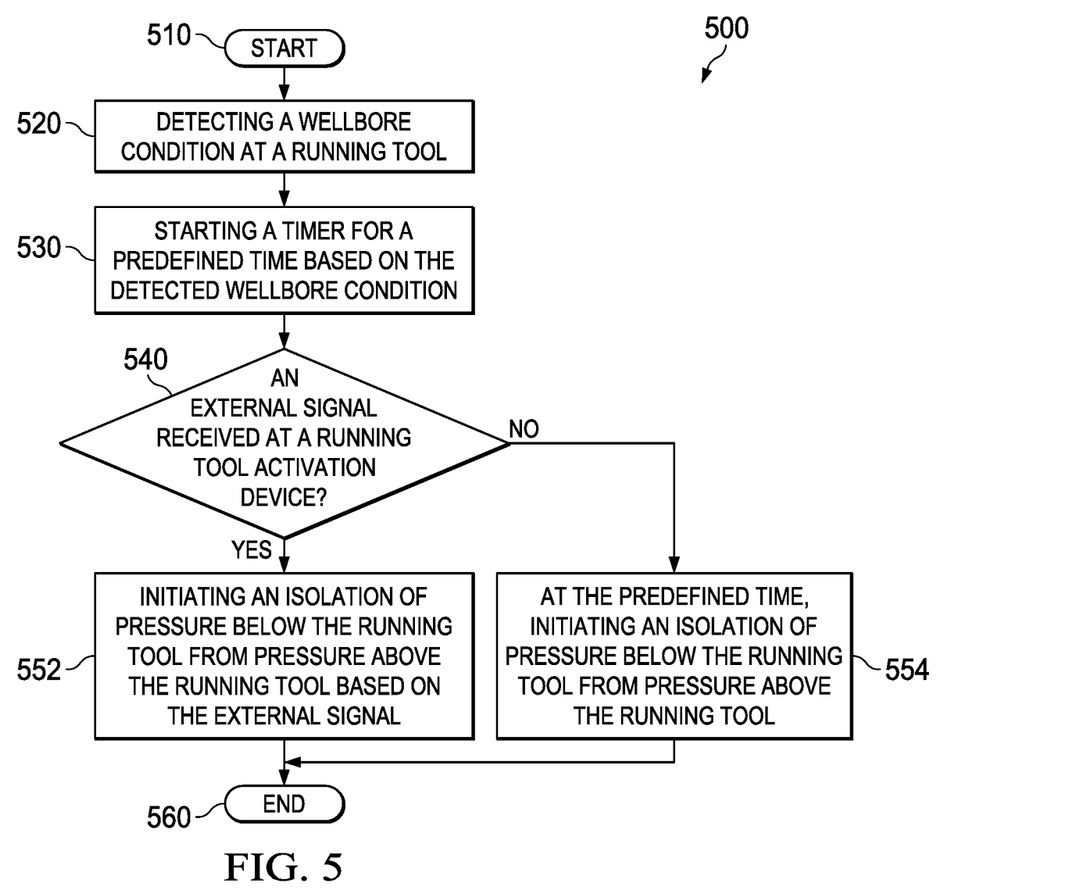
FIG. 5 illustrates a flow diagram of a method for activating a running tool.

FIG. 5 illustrates a flow diagram of a method 500 for activating a running tool such as the liner hanger running tool 150 in FIG. 1. The method may be carried out by a running tool activation device such as the RTAD 200 in FIGS. 2-4, which is integrated or attached to a running tool. The method 500 starts at step 510.

At step 520, a wellbore condition, such as depth, temperature, hydrostatic pressure, acceleration, and inclination, at the running tool is detected to determine if the RTAD has reached its setting position/depth. A sensor such as the sensor 234 in FIGS. 2-4 may be used to detect the wellbore condition, and a logic board such as the logic board 232 in FIGS. 2-4 may compare the detected wellbore condition to respective threshold values and determine whether the RTAD has reached its setting position/depth.

At step 530, when it has been determined that the running tool/RTAD has reached its setting position/depth based on the detected wellbore condition, a timer for a predefined time is started. An internal timer of the logic board can be used. As described above, the predefined time may be programmed to the logic board prior to the start of the method 500, e.g., deployment of the RTAD.

At step 540, it is determined whether an external (activation) signal has been received at the RTAD. The external signal is received from surface equipment such as the controller 180 in FIG. 1. The external signal may include, as mentioned above, a predefined sequence of pressures applied to the internal of the running tool/RTAD, a predefined sequence of movements, e.g., a rotation or a linear translation, of a drill string connected to the top of the running tool/RTAD, a predefined sequence of tension and compression applied to the running tool/RTAD, a predefined sequence of acoustic signals sent to the running tool/RTAD, or any combination of the above.

When the external signal is received at the RTAD, an isolation of pressure below the running tool from pressure above the running tool is initiated based on the external signal at step 552. As discussed above, the isolation is achieved by closing a flapper of the RTAD such as the flapper 216 in FIGS. 2-4. The closure of the flapper allows building up of sufficient pressure, which is used to push down the expansion cone into the liner hanger for an attachment of the liner to the previously run casing. Once the isolation is achieved, the method 500 proceeds to end at step 560.

At step 554, if the RTAD does not receive the external signal before the timer expires, an isolation of pressure below the running tool from pressure above the running tool is initiated at the predefined time. This initiation is autonomous and local with respect the RTAD because the timer is programmed to set at the predefined time prior to the deployment of the RTAD. As in step 552, the flapper is closed to isolate the pressure below the running tool from the above. Once the isolation is achieved, the method 500 proceeds to end at the step 560.

Figure 6:
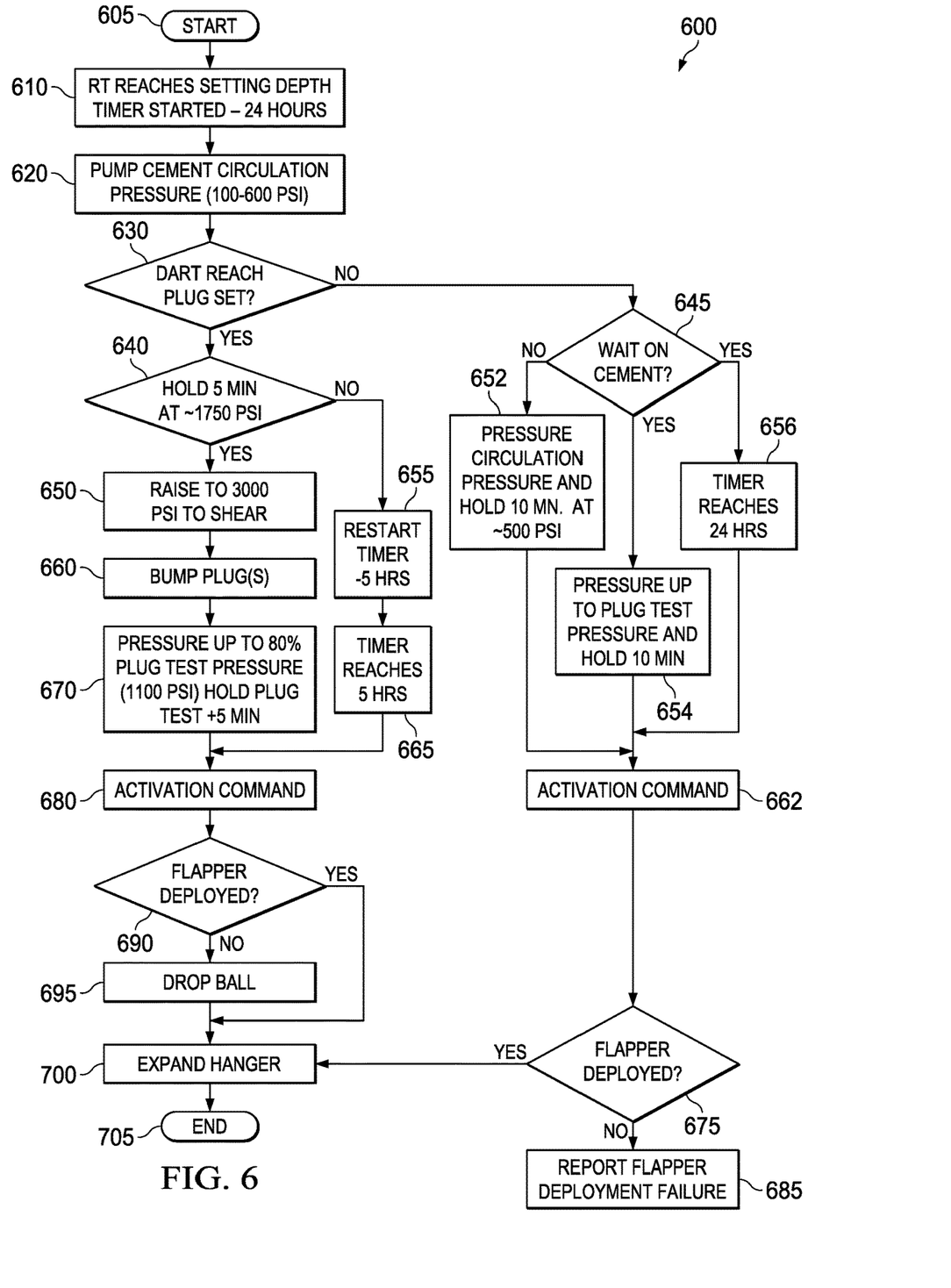
FIG. 6 illustrates a flow diagram of program logic for activating a running tool for setting an expandable liner hanger.

FIG. 6 illustrates a flow diagram of a method 600 for activating a running tool. The method 600 can be implemented as programmed logic and referred to hereinafter as program logic 600. The program logic 600 may be based on a typical planned sequence of events recorded in a log, such as a log from an offshore job on a rig in ocean. In FIG. 6, the program logic 600 uses a predefined sequence of pressures to initiate the isolation of pressure and set an expandable hanger. The program logic 600 can be part of a controller, such as the controller 180 of FIG. 1. The program logic 600 starts at step 605.

At step 610, the running tool reaches a certain depth/position inside the wellbore and a timer is set for a predefined time, e.g. 24 hours. The depth may be detected by a sensor such as the sensor 234 in FIGS. 2-4, and the timer may be an internal timer of a logic board such as the logic board 232 in FIGS. 2-4.

At step 620, cement slurry is pumped through a drill string using a circulation pressure, e.g., 100-600 PSI, which may vary based on the well conditions. At step 630, the logic 600 determines whether a cement dart that preceded the cement slurry has reached the plug set. If the dart has reached the plug set, the logic 600 proceeds to step 640 on the left, and if the dart has not, the logic 600 proceeds to step 645 on the right.

At step 640, a predefined amount of pressure, approximately 1750 PSI, is applied and a determination is made if the predefined amount of pressure can be held for a certain amount of time, such as five minutes. If the pressure is held for the certain amount of time, then the pressure is raised to approximately 3000 PSI at step 650 to shear a diaphragm or valve in the dart such that the cement slurry may reach the annulus. At step 660, it is determined that the plug set has been bumped against the casing shoe at the bottom of the liner. Once the plug set is pressure tested and back flow tested, the logic 600 proceeds to apply pressure of approximately 1100 PSI, which is about 80% of the plug test pressure, for more than a designated amount of time, such as five minutes, to generate an activation command at step 670.

If the applied pressure is not held for the certain amount of time at step 640, the timer is restarted for a particular time period, such as five hours at step 655. At this point, while the cement is in position based on the pumped volume, no testing is possible for the plug since the plug set did not bump and failed to seal. At step 665, the activation command is generated once the restarted timer reaches the particular time period.

At step 680, the activation command is sent to a trigger assembly, such as the trigger assembly 240 in FIGS. 2-4, to initiate the deployment of a flapper, such as the flapper 216 in FIGS. 2-3. Once it is determined at step 690 that the flapper has been deployed, the logic 600 proceeds to expand the liner hanger at step 700. However, if it is determined at step 690 that the flapper has not been deployed, a backup activation method, e.g., the ball drop activation, is employed at step 695. The liner hanger expands at step 700 and the logic 600 ends at step 705.

Going back to step 630, the logic 600 can determine that the cement dart has not reached the plug set. At step 645, the logic 600 then determines whether to wait for the cement to cure. If a determination is made to not wait for the cement to cure, pressure just below the circulation pressure, e.g., approximately 500 PSI, is applied for some time, e.g., 10 minutes, to generate the activation command without circulating the cement at step 652. The activation command is generated and sent to the trigger assembly at step 662.

If it is determined to wait for the cement to cure at step 645, the logic 600 waits on the cement to cure. Once the cement is cured, the logic 600 either applies the plug test pressure, e.g., approximately 1300 PSI, at step 654 or simply waits until the original timer reaches the predefined amount of time at step 656. At step 662, the activation command is generated and sent to the trigger assembly for the flapper deployment.

At step 675, the logic 600 determines whether the flapper is deployed. If the logic 600 determines that the flapper has been deployed, the liner hanger is expanded at step 700. However, if the logic 600 determines that the flapper has not been deployed, this is either reported to the surface or otherwise learned at the surface when the liner hanger fails to expand at step 685. Unlike the step 695, the ball drop activation is not available here because the dart that did not reach the plug set is still stuck above the running tool and would block the ball from reaching the seat. Once the liner hanger is expanded at step 700, the logic 600 ends at step 705.

It is understood that the logic 600 is an example and is not limited to the illustrated steps. As such, the logic 600 is not limited to the flapper and ball drop as only means of activation and the remote activation signals from the surface to the RTAD is not limited to the pressure applied to the internal of the drill pipe.

Those skilled in the art to which this application relates will appreciate that other and further additions, deletions, substitutions and modifications may be made to the described embodiments.

The above-described system, apparatus, methods and logics or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system or apparatus described herein.

Certain embodiments disclosed herein can further relate to computer storage products with a non-transitory computer-readable medium that have program code thereon for performing various computer-implemented operations that embody the apparatuses, the systems or carry out the steps of the methods set forth herein.

Embodiments disclosed herein include:
A. A method for activating a running tool, comprising detecting a wellbore condition at the running tool, based on a signal received from a surface equipment, initiating an isolation of pressure below the running tool from pressure above the running tool, and if the signal is not received, initiating the isolation of the pressure at a predefined time based on the wellbore condition.
B. A device for activating a running tool, comprising a sensor configured to detect a wellbore condition at the running tool, and a logic board programmed to initiate an isolation of pressure below the running tool from pressure above the running tool based on a signal received from a surface equipment, wherein the logic board is further programmed to initiate the isolation of the pressure at a predefined time based on the wellbore condition if the signal is not received.
C. A system for activating a running tool, comprising an activation device configured to detect a wellbore condition at the running tool, and a surface equipment configured to apply a predefined sequence of pressures to the activation device, wherein the activation device is further configured to initiate an isolation of pressure below the running tool from pressure above the running tool based on the wellbore condition and the predefined sequence of pressures.

Each of embodiments A, B, and C may have one or more of the following additional elements in combination:
Element 1: wherein the initiating at the predefined time is carried out autonomously. Element 2: wherein the isolation includes closing a flapper valve of the running tool. Element 3: wherein the signal includes a predefined sequence of pressures applied to the running tool. Element 4: wherein the signal includes a predefined sequence of movements of the running tool. Element 5: wherein the signal includes a predefined sequence of tension and compression applied to the running tool. Element 6: wherein the signal includes a predefined sequence of acoustic signals. Element 7: wherein the wellbore condition at the running tool is selected from the group consisting of a depth, a temperature, a hydraulic pressure, a circulation rate, and an inclination. Element 8: wherein the logic board is programmed to initiate the isolation of pressure below the running tool at the predefined time autonomously. Element 9: wherein the isolation of the pressure is achieved by a closure of a flapper valve of the running tool. Element 10: a pressure transducer configured to convert the predefined sequence of pressures to an activation command for the logic board. Element 11: a trigger assembly configured to achieve the isolation by closing a flapper valve of the running tool. Element 12: a pressure transducer configured to convert the predefined sequence of pressures into an activation command for the isolation. Element 13: wherein the running tool is further configured to initiate the isolation at a predefined time based on the wellbore condition if the predefined sequence of pressures is not applied to the running tool.

What is claimed is:
1. A method for activating a running tool, comprising:
   detecting a wellbore condition at said running tool;
   upon receiving a signal from surface equipment within a predefined time period, initiating an isolation of pressure below said running tool from pressure above said running tool; and
   if said signal is not received within said predefined time period, initiating said isolation of said pressure at an expiration of said predefined time period, wherein said predefined time period starts when said wellbore condition is detected at said running tool.
2. The method of claim 1, wherein said initiating at said expiration of said predefined time period is carried out autonomously.
3. The method of claim 1, wherein said isolation includes closing a flapper valve of said running tool.

4. The method of claim 1 wherein said signal includes a predefined sequence of pressures applied to said running tool.

5. The method of claim 1 wherein said signal is selected from the group consisting of a predefined sequence of movements of said running tool, a predefined sequence of tension and compression applied to said running tool, and a predefined sequence of acoustic signals.

6. The method of claim 4 further comprising converting said predefined sequence of pressures to an activation command for said running tool.

7. The method of claim 1 wherein said wellbore condition at said running tool is selected from the group consisting of a depth, a temperature, a hydraulic pressure, a circulation rate, and an inclination.

8. A device for activating a running tool, comprising:
a sensor configured to detect a wellbore condition at said running tool; and
a logic board programmed to initiate an isolation of pressure below said running tool from pressure above said running tool upon receiving a signal from surface equipment within a predefined time period;
wherein said logic board is further programmed to initiate said isolation of said pressure at an expiration of said predefined time period if said signal is not received at said running tool within said predefined time period, wherein said predefined time period starts when said wellbore condition is detected by said sensor.

9. The device of claim 8, wherein said logic board is programmed to initiate said isolation of said pressure at said expiration of said predefined time period autonomously.

10. The device of claim 8, wherein said isolation of said pressure is achieved by a closure of a flapper valve of said running tool.

11. The device of claim 8, wherein said signal includes a predefined sequence of pressures applied to said running tool.

12. The device of claim 11, further comprising a pressure transducer configured to convert said predefined sequence of pressures to an activation command for said logic board.

13. The device of claim 8, wherein said signal is selected from the group consisting of a predefined sequence of movements of said running tool, a predefined sequence of tension and compression applied to said running tool, and a predefined sequence of acoustic signals.

14. The device of claim 8, wherein said wellbore condition at said running tool is selected from the group consisting of a depth, a temperature, a hydraulic pressure, a circulation rate, and an inclination.

15. A system for activating a running tool, comprising:
an activation device configured to detect a wellbore condition at said running tool; and
surface equipment configured to apply a predefined sequence of pressures to said activation device;
wherein said activation device is further configured to initiate an isolation of pressure below said running tool from pressure above said running tool at an expiration of a predefined time period if said predefined sequence of pressures is not received within said predefined time period, which starts when said wellbore condition is detected by said activation device.

16. The system of claim 15, further comprising a trigger assembly configured to achieve said isolation by closing a flapper valve of said running tool.

17. The system of claim 15, further comprising a pressure transducer configured to convert said predefined sequence of pressures into an activation command for said isolation.

18. The system of claim 15, wherein said running tool device is configured to initiate said isolation at said expiration of said predefined time period autonomously.

19. The system of claim 15, wherein said wellbore condition at said running tool is selected from the group consisting of a depth, a temperature, a hydraulic pressure, a circulation rate, and an inclination.

* * * * *

UNITED STATES PATENT AND TRADEMARK OFFICE
CERTIFICATE OF CORRECTION

PATENT NO. : 10,794,157 B2  
APPLICATION NO. : 15/752499  
DATED : October 6, 2020  
INVENTOR(S) : Kohn et al.

It is certified that error appears in the above-identified patent and that said Letters Patent is hereby corrected as shown below:

In the Specification

Column 4, Line 32, after --such that the-- delete "RAID" and insert --RTAD--

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*